United States Patent Office 2,921,859
Patented Jan. 19, 1960

2,921,859

POROUS REFRACTORY MATERIAL AND METHOD FOR MANUFACTURING THE SAME

Yves Godron, Paris, France, assignor to Société Anonyme des Manufactures des Glaces et Produits Chimiques de Saint-Gobain, Chauny et Cirey, Paris, France No Drawing. Application August 2, 1955
Serial No. 526,073

Claims priority, application France August 6, 1954

12 Claims. (Cl. 106—41)

This invention relates to new porous refractory material with zirconium silicate base having a total porosity (ratio of the pore volume to the total apparent volume) greater than 50% and having the following properties, and also to its manufacture:

(a) A low thermal diffusivity; this characteristic is known to be very important for some applications in the field of thermal insulation.

(b) A maximum temperature at which it may be used of about 1500° C., which is higher than that of the presently known silico-aluminous articles of the same porosity.

(c) An outstanding ability to withstand abrasion at high temperature; this property permits its usage for manufacturing articles like burners through which gases pass at high rates of speed, surface combustion burners, etc.

(d) A good mechanical strength to withstand handling.

The invention has for its object the provision of a new porous refractory material with zirconium silicate base characterized by having an alumina content higher than 8% and usually between 8% and 20% by weight, with a preferred maximum of 20% by weight alumina.

I have found that such alumina content in porous refractories having a zirconium silicate base improves the properties of these porous refractories and, in particular, raises their ability to withstand heat under constant load, so that they are capable of withstanding higher temperatures than prior refractories of the same general type were capable of standing.

My tests have demonstrated that an improvement in the ability to withstand crushing is obtained when zirconium silicate base refractories have an alumina content of 8% by weight. It is advisable to keep the alumina content around this value and in any case below 20% by weight, in order to retain the above cited specific properties of the porous articles with zirconium silicate base. The price of the raw materials to be used must also be taken into consideration, and finally the choice of the alumina content may be determined for each particular manufacture by taking into consideration the characteristics to be obtained.

Refractories in accordance with the invention preferably have at least 50% porosity as defined herein, physically maintain their shape at 1500° C., and have the following analysis:

| | Percent by weight |
|---|---|
| $SiO_2$ | 19–42 |
| $ZrO_2$ | 50–73 |
| $Al_2O_3$ | 8–20 |

Refractories in accordance with the invention may also contain impurities as such or as fluxes from 0 to several percent of the whole. It will be understood that the total of all the above ingredients, plus impurities is 100%.

Porous refractory articles according to the invention can be obtained by any appropriate process, the standard methods and material for forming gas within the mass whereby to render the refractory porous being useful with these refractories as with others. A suitable gas-forming material is cork. Such articles can be obtained whatever be the way of developing the porosity therein, and whatever be the initial state of the refractory mix containing zirconium silicate (slip, liquid paste, soft paste, hard paste, dry paste, or hyperpressed bricks).

The alumina may be introduced in many ways, for instance as corundum, calcined alumina, or as hydrated alumina, bauxite and other hydrated alumina ore, or as alumina silicate unburned or burned, natural or artificial. Alumina may be introduced in the form of a fused product containing a predetermined amount of $SiO_2$, such product having been fused for example in an electric furnace. The said $Al_2O_3=SiO_2$ product usually contains a vitreous phase and does not cause any shrinkage of the refractory articles. These two characteristics are particularly of value in certain types of refractories. The material for carrying the alumina to be added can be used alone or in combination with several constituents. The presence of unburned products gives to the mixture which forms the refractory articles a strength remaining at least during the first part of the firing. In any case, it is advisable to use raw material with high alumina content in order to obtain a better resistance to crushing.

When the alumina-carrying raw material also contains silica it has been found that the molecular ratio of alumina to silica is advantageously greater than 1.0 and that it is preferably greater than 1.5. The alumina-carrying raw material should contain only small quantities of fluxes such as iron oxide, titanium oxide, calcium oxide, sodium oxide, potassium oxide, etc. This added material must be finely comminuted. My tests show that this material should preferably have a grain size smaller than 0.15 mm. Good distribution of the added material throughout the refractory and its effect on the zirconium silicate are thus made easier.

The following examples show some of the experimental results for different mixtures.

The mixtures were obtained by using zircon sand from Australia (natural zirconium silicate) with the following chemical analysis by weight:

| | Percent |
|---|---|
| $SiO_2$ | 32.9 |
| $ZrO_2$ | 66.5 |
| $Fe_2O_3$ | 0.4 |
| $TiO_2$ | 0.2 |

Both comminuted and uncomminuted zircon were used.

The uncomminuted zircon had the following screen analysis on the Tyler screen series:

| | Percent |
|---|---|
| Amount retained by the 80 mesh screen (openings 0.18 mm.) | 0 |
| Amount retained by the 150 mesh screen (openings 0.105 mm.) | 3.5 |
| Amount retained by the 200 mesh screen (openings 0.075 mm.) | 100 |

The screen analysis of the pulverized zircon was the following:

| | Percent |
|---|---|
| Amount retained by the 150 mesh screen | 0 |
| Amount retained by the 200 mesh screen | 2 |

In the following examples the proportion of uncomminuted zircon was not changed, but the comminuted zircon and the amount of alumina carrying material was varied. Water was added, together with sufficient quantities of combustible material in order to obtain the desired porosity, and calcium lignosulfonate called "Avebene," sold by the Avebene Company for binding purposes. The product obtained after mixing was introduced in metal molds of 40 x 60 x 120 mm. and molded as briquettes which were then left to dry in the air, dried for 24 hours at 110° C. and finally fired at 1500° C. for two hours (dwell). The binder disappears on firing.

An example of manufacturing porous refractory bricks according to the invention is as follows:

The following ingredients were intimately mixed.

| | Parts by weight |
|---|---|
| Uncomminuted Australian zircon | 50 |
| Comminuted Australian zircon passing through 200 mesh screen | 35 |
| Sillimanite passing through 150 mesh screen | 15 |

This mixture was moistened with the following mixture:

| | Parts by weight |
|---|---|
| Water | 18 |
| Bisulfitic residue from the paper industry (calcium lignosulfonate) | 3 |
| Cork 15 to 30 mesh | 4.4 |

The mix was pugged and molded into bricks, left to dry in the air for eight days, dried at 110° C. and fired at 1500° C. for two hours (dwell).

Cylindrical test specimens 28 mm. diameter and 40 mm. high were cut by a diamond rock drill crown boring tool from the briquettes after they had cooled. Load tests at increasing temperature were conducted on these specimens under a constant load of 2 kg./cm.$^2$ in the following way: the specimens were placed in the hottest zone of a graphite resistor furnace suplied with low voltage current. The temperatures at which sagging of the specimens began and at which they sagged totally were noted.

In Table I all the results obtained with mixtures of various apparent densities and with or without addition of various silico-aluminous materials are listed.

The results obtained by using corundum are represented in Table II. It was observed that, particularly in this case, the firing at 1550° C. offered a marked advantage over the heating at 1500° C. and gave products that are more refractory under constant load.

The results presented in Tables I and II show that the load-bearing capacity at high temperature greatly increases when 15% of the comminuted zircon is replaced by 15% alumina or alumina-carrying material.

*Table I*

| Mixture | | | Firing temperature, °C. | Apparent density | Porosity, percent | Sagging temperature under 2 kg./cm². load | |
|---|---|---|---|---|---|---|---|
| Uncomminuted Zircon, percent | Comminuted Zircon, percent | Added material | | | | beginning of the sagging, °C. | Total sagging, °C. |
| 59 | 41 | nil | 1,500 | 1.76 | 63 | 1,015 | 1,015 |
| 59 | 41 | nil | 1,500 | 2.31 | 51 | 1,060 | 1,100 |
| 50 | 50 | nil | 1,500 | 1.84 | 61 | 1,035 | 1,065 |
| 50 | 50 | nil | 1,500 | 2.14 | 55 | 1,090 | 1,090 |
| 50 | 35 | "A" 15% | 1,500 | 1.55 | 64 | 1,495 | 1,515 |
| 50 | 35 | "A" 15% | 1,500 | 1.63 | 62 | 1,485 | 1,525 |
| 50 | 35 | "A" 15% | 1,500 | 1.79 | 58 | 1,485 | 1,515 |
| 50 | 35 | burned Kyanite 15% | 1,500 | 1.66 | 61 | 1,515 | 1,545 |

"A" fused article comprising 75% $Al_2O_3$, 20% $SiO_2$ and 5% impurities.

*Table II*

| Mixture | | | Firing temperature, °C. | Apparent density | Porosity, percent | Sagging temperature under 2 kg./cm². load | |
|---|---|---|---|---|---|---|---|
| Uncomminuted Zircon, percent | Comminuted Zircon, percent | Added material | | | | beginning of the sagging, °C. | Total sagging, °C. |
| 50 | 35 | Corundum, 15% | 1,500 | 1.72 | 60 | 1,385 | 1,435 |
| 50 | 35 | do | 1,500 | 2.00 | 53 | 1,410 | 1,440 |
| 50 | 35 | do | 1,550 | 1.76 | 59 | 1,510 | 1,570 |
| 50 | 35 | do | 1,550 | 2.00 | 53 | 1,530 | 1,570 |

What is claimed is:

1. A refractory material having a total porosity above 50%, composed essentially of zirconia, silica and alumina, the zirconia being present between about 50 and about 73% by weight, the alumina being present between about 8% and about 20% by weight, and silica being present between about 19 and about 42% by weight.

2. A refractory material having a total porosity above 50% consisting in its essential ingredients of zirconium silicate and between 8% and 20% alumina by weight.

3. A refractory material having a total porosity above 50% analyzing by weight about 8% to about 20% alumina, 19% to 42% silica, and 50% to 73% zirconia.

4. A porous refractory material having a total porosity above 50% and having as its essential constituents zirconia, silica, and alumina, the minimum content of said constitutents by weight percent being silica 19%, zirconia 50%, and alumina 8%, the maximum content of alumina being 20%.

5. The method of making a porous refractory material with zirconium silicate base comprising mixing together zirconium silicate, comminuted alumina in a weight proportion between about 8% and about 20% of the porous refractory material and pore-forming material adequate to produce a total porosity over 50%, and firing the mixture.

6. The method of making a porous refractory material with zirconium silicate base comprising mixing together zirconium silicate, comminuted material comprising alumina in a proportion corresponding to a percentage of alumina between about 8% and about 20% by weight of the porous refractory material, water, and pore-forming material in quantity producing over 50% porosity on firing, forming the mixture into unit shapes, and drying and firing them.

7. The method of making a porous refractory material with zirconium silicate base comprising mixing together zirconium silicate, corundum in a proportion corresponding to a percentage of alumina comprised between about 8% and about 20% by weight of the porous refractory material, water, and pore-forming material in quantity producing over 50% porosity on firing, forming the mixture into unit shapes, and drying and firing them.

8. The method of making a porous refractory material with zirconium silicate base comprising mixing together zirconium silicate, kyanite in a proportion corresponding to a percentage of alumina comprised between about 8% and about 20% by weight of the porous refractory material, water, and pore-forming material in a quantity sufficient to produce over 50% porosity on firing, forming the mixture into unit shapes, and drying and firing the shapes.

9. The method of making a porous refractory material with zirconium silicate base, comprising mixing zirconium silicate with finely comminuted aluminous material selected from the group consisting of corundum, calcined alumina, hydrated alumina, and aluminum silicate, in proportions such as to have between about 8% and about 20% alumina in the porous refractory material, adding water and sufficient gas-producing material to obtain over 50% porosity, forming the mixture into unit shapes, drying and firing them.

10. The method according to claim 6 in which the aluminous material contains silica in such proportion that the molecular ratio of alumina to silica is greater than 1.

11. The method according to claim 10 in which the molecular ratio of alumina to silica is greater than 1.5.

12. The method according to claim 6 in which the aluminous material has a grain size lower than 0.15 mm.

References Cited in the file of this patent
FOREIGN PATENTS 733,901   Germany _____ 1943

OTHER REFERENCES

Serial No. 382,101, Passelecq (A.P.C.), published May 11, 1943.